Aug. 6, 1963 S. ODERMAN ET AL 3,100,039
TURNING APPARATUS FOR CONVEYER SYSTEM
Filed Sept. 1, 1961 3 Sheets-Sheet 1
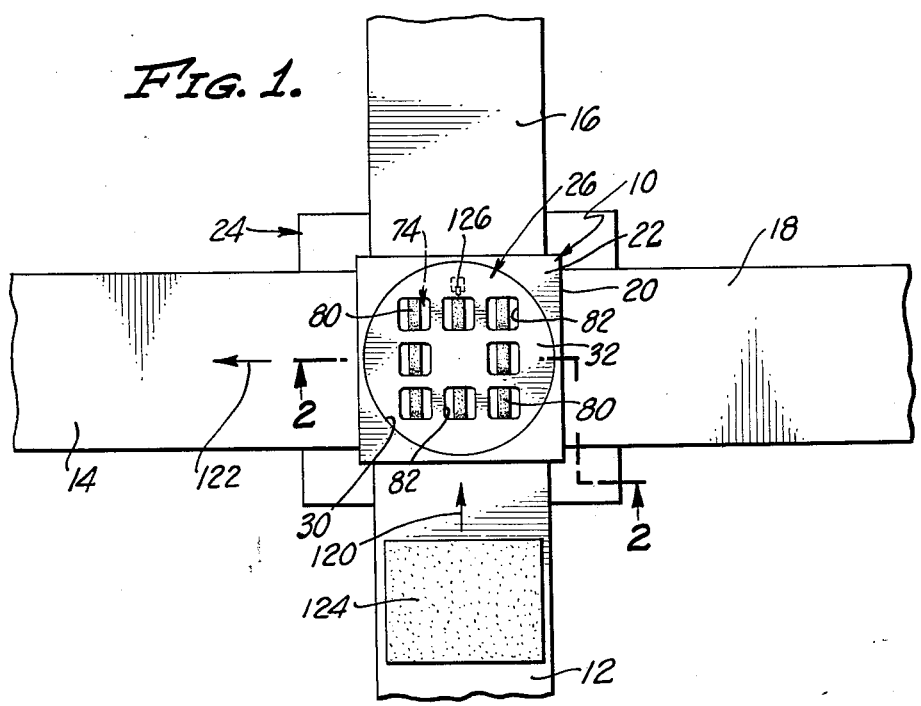
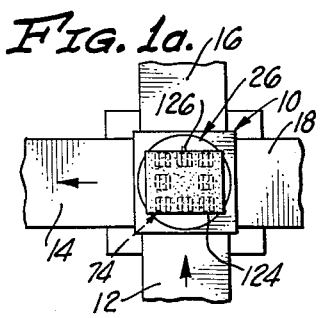
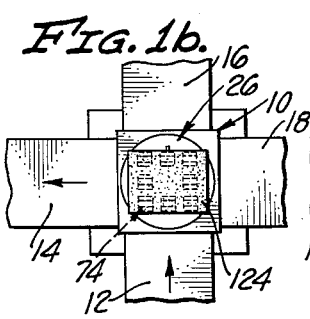
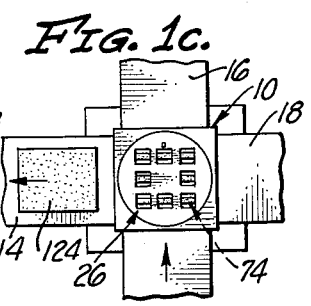
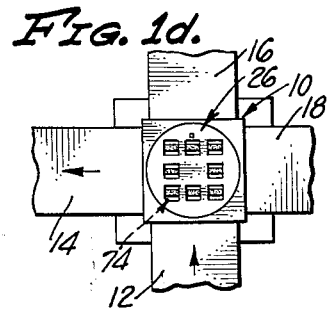
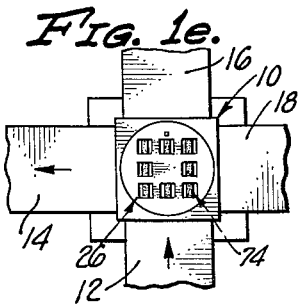
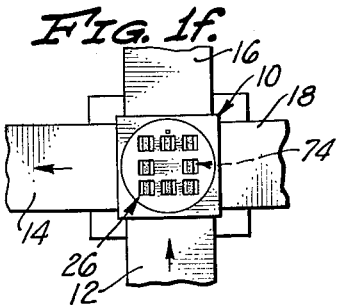
INVENTORS
SAMUEL ODERMAN,
DONALD V. WEBER
BY THEIR ATTORNEYS
HARRIS, KIECH, RUSSELL & KERN Aug. 6, 1963

S. ODERMAN ET AL 3,100,039

TURNING APPARATUS FOR CONVEYER SYSTEM

Filed Sept. 1, 1961

INVENTORS
SAMUEL ODERMAN,
DONALD V. WEBER
BY THEIR ATTORNEYS
HARRIS, KIECH, RUSSELL & KERN

Aug. 6, 1963   S. ODERMAN ET AL   3,100,039
TURNING APPARATUS FOR CONVEYER SYSTEM
Filed Sept. 1, 1961   3 Sheets-Sheet 3

INVENTORS
SAMUEL ODERMAN,
DONALD V. WEBER
BY THEIR ATTORNEYS
HARRIS, KIECH, RUSSELL & KERN

United States Patent Office 3,100,039
Patented Aug. 6, 1963

3,100,039
TURNING APPARATUS FOR CONVEYER SYSTEM
Samuel Oderman, Whittier, and Donald V. Weber, Santa Ana, Calif., assignors to Sta-Hi Corporation, Whittier, Calif., a corporation of California
Filed Sept. 1, 1961, Ser. No. 135,666
4 Claims. (Cl. 198—33)

The present invention relates in general to conveyer systems and, more particularly, to an apparatus for turning articles being transported by a conveyer system, a primary object of the invention being to provide a turning apparatus capable of changing either the direction of travel of an article being conveyed, or the orientation of the article, or both.

More specifically, an important object of the invention is to provide a turning apparatus which includes two coaxial and substantially coextensive platforms both pivotable about a common upright axis, one platform being a driving platform which includes coplanar, horizontal driving rollers, and the second platform being movable upwardly and downwardly relative to the driving platform between a lower position wherein the driving rollers project above the second platform and an upper position wherein the driving rollers are below the upper surface of the second platform.

Other objects of the invention are to provide a turning apparatus having the foregoing characteristics wherein the second platform may be pivoted in either direction from a neutral position, and wherein the driving platform may either be pivoted in opposite directions from a neutral position, or may have its rollers driven in opposite directions, or both.

With the foregoing construction, when the second platform is in its lower position, the driving platform either removes an article from an incoming conveyer, or discharges it onto an outgoing conveyer. However, if the second platform is elevated into its upper position after the driving platform has removed the article from the incoming conveyer, the movement of the article is interrupted. During this interruption, various operations, or combinations of operations, may be performed on the driving platform, the driving rollers and the second platform. Such operations may include pivoting the driving platform in either direction, reversing the direction of rotation of the driving rollers and/or pivoting the second platform in either direction. The operation, or combination of operations, performed depend on the direction of discharge and discharge orientation desired for the article, any direction of discharge, or discharge orientation, or combination thereof, being attainable, which is an important feature of the invention.

The foregoing objects, advantages, features and results of the present invention, together with various other objects, advantages, features and results thereof which will be evident to those skilled in the turning apparatus art in the light of this disclosure, may be achieved with the exemplary embodiment of the invention described in detail hereinafter and illustrated in the accompanying drawings, in which:

FIGS. 1, 1a, 1b, 1c, 1d, 1e and 1f are plan views of a conveyer system embodying the turning apparatus of the invention and illustrating successive steps in the operation of the turning apparatus in accordance with one mode of operation thereof, FIGS. 1a to 1f being on a reduced scale as compared to that of FIG. 1;

Referring initially to FIG. 1 of the drawings, the turning apparatus of the invention is designated generally by the numeral 10 and, in the particular construction illustrated, is shown as located at the junction of four conveyers 12, 14, 16 and 18 arranged in a cruciform pattern. It will be understood, however, that the turning apparatus 10 may be used with any two of the conveyers 12, 14, 16 and 18, as will be discussed in more detail hereinafter. The conveyers are shown as being of the belt type, but they may be of any other suitable construction.

Figure 2:
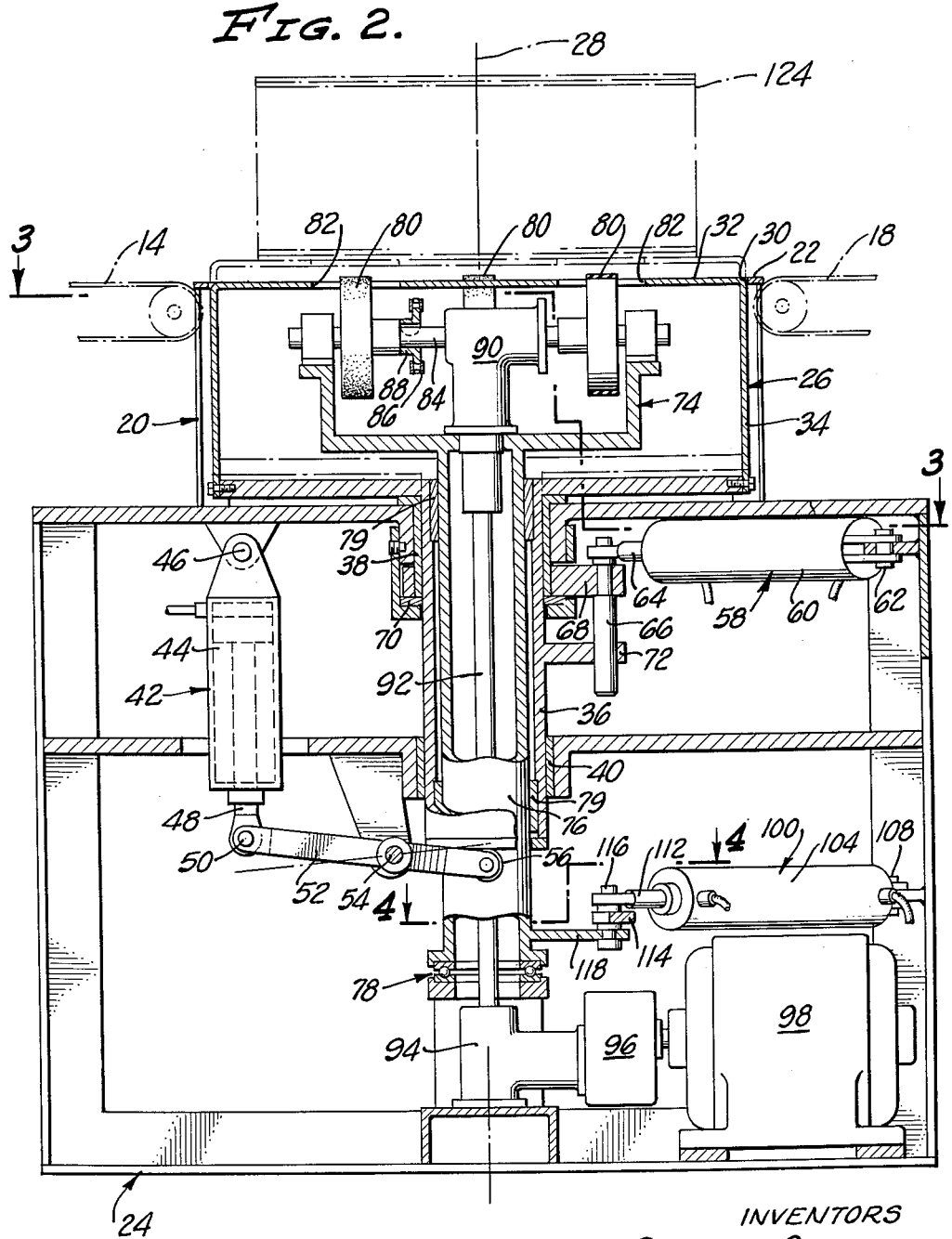
FIG. 2 is an enlarged, vertical sectional view taken along the irregular arrowed line 2—2 of FIG. 1 (or along the irregular arrowed line 2—2 of FIG. 3)
Figure 3:
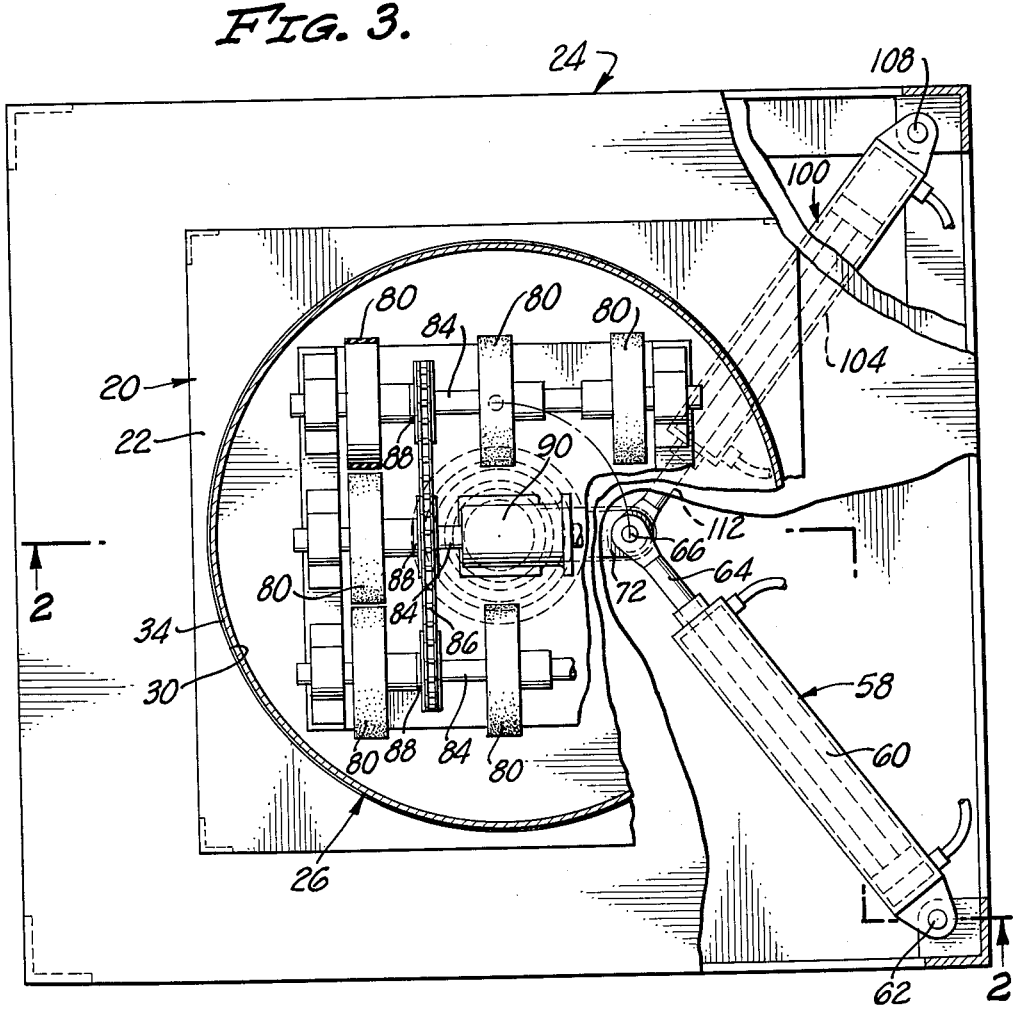
FIG. 3 is a horizontal sectional view taken generally along the irregular arrowed line 3—3 of FIG. 2, some parts being broken away to expose others.
Figure 4:
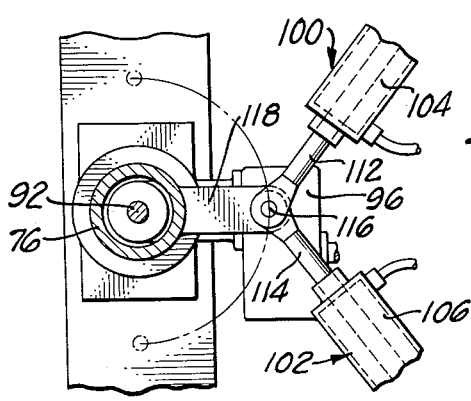
FIG. 4 is a fragmentary horizontal sectional view taken along the irregular arrowed line 4—4 of FIG. 2 of the drawings.

Referring to FIG. 2 of the drawings, the turning apparatus 10 includes an upper frame or housing 20 having an upper surface 22 which is flush with the conveyers 12, 14, 16 and 18. The upper housing 20 is shown as superimposed on a lower frame or housing 24.

Within the upper housing 20 is a platform or turntable 26 pivotable through a predetermined angle, 90° in the particular construction illustrated, about an upright, preferably vertical, axis 28. The turntable 26 extends upwardly into a central circular opening in the upper surface 22 of the upper housing 20. The diameter of the opening 30 approaches the width of the upper housing 20, which is square, so as to locate the periphery of the turntable 26 as close as possible to the conveyers 12, 14, 16 and 18. As will be explained, the turntable 26 is vertically movable between a lower position, shown in solid lines in FIG. 2, wherein its upper surface 32 is flush with the upper surface 22 of the upper housing 20, and an upper position, shown in broken lines in FIG. 2, wherein its upper surface 32 is above the upper surface 22 of the upper housing.

The turntable 26 includes a cylindrical housing 34 disposed within the upper housing 20 and supported by a central, depending, tubular column 36. This column is pivotable about the axis 28, and is reciprocable along such axis, in upper and lower bearings 38 and 40 carried by the lower housing 24.

The turntable 26 is adapted to be elevated from its lower position to its upper position, in the particular construction illustrated, by a single-acting hydraulic or pneumatic unit 42 comprising a cylinder 44 pivotally connected to the lower housing 24 at 46 and a piston rod 48 pivotally connected at 50 to one end of a bifurcated lever 52. This lever is pivotally mounted intermediate its ends, at 54, on the lower housing 24. The bifurcated end of the lever 52 carries rollers 56, only one of which is visible, engageable with the lower end of the turntable column 36. As will be apparent, by energizing the unit 42, the turntable 26 is elevated into its upper position. Upon de-energization of the unit 42, gravity returns the turntable 26 to its lower position.

The turntable 26 is also pivotable in at least one direction, through an angle of 90° in the construction illustrated, from what might be termed its normal position. Such pivoting is effected by a double-acting hydraulic or pneumatic unit 58 comprising a cylinder 60 pivotally connected at 62 to the lower housing 24, and comprising a piston rod 64 pivotally connected to a vertical pin 66 carried by a horizontal collar 68. This collar is pivotable about the axis 28 on the upper bearing 38 for the turntable column 36, and is supported by a thrust bearing 70 suitably mounted on the lower housing 24. The pin 66 extends downwardly below the collar 68 through an opening in an arm 72 on the turntable column 36. The arm 72 is vertically slidable on the pin 66 to permit the turntable column 36 to move vertically.

As will be apparent, upon energization of the unit 58 in one direction, the turntable 26 is pivoted 90° in one direction from its normal position. Upon energization of the unit 58 in the opposite direction, the turntable 26 is returned to its normal position. It will be understood, however, that the turntable 26 may be pivoted 90° in either direction from its normal position, if required by a particular conveyor system with which the turning apparatus 10 of the invention is used.

The turning apparatus 10 also includes a driving platform 74 disposed within the housing 34 of the turntable 26 and mounted on a central, depending, tubular column 76 which extends downwardly through and is concentric with the turntable column 36. The column 76 is supported at its lower end by a thrust bearing 78, and is pivotable in bearings 79 carried by the turntable column 36. The driving platform 74 includes coplanar, horizontal driving rollers 80 which project upwardly above the upper surface 32 of the turntable 26 when the turntable is in its lower position. The upper surface 32 of the turntable 26 is provided with openings 82 therein through which the driving rollers 80 project upwardly when the turntable 26 is in its lower position.

In the particular construction illustrated, there are eight of the driving rollers 80 arranged in a square pattern. There are three rows and three columns of the driving rollers 80, the rows and columns being equally spaced. Each of the outer rows and columns contains three of the driving rollers 80, while each of the center row and column contains two of the driving rollers. The number and arrangement of the openings 82 correspond to the number and arrangement of the driving rollers 80, and the openings 82 are large enough to permit the driving rollers to project upwardly above the upper surface 32 of the turntable 26, when the latter is in its lower position, for any relative positions of the turntable 26 and the driving platform 74 spaced 90° apart.

The driving rollers 80 are carried by three parallel shafts 84 which are interconnected by a chain 86 meshed with sprockets 88 on the respective shafts. The center shaft is driven by a right-angle gear unit 90 into which extends an input shaft 92 lying on the axis 28 within the tubular column 76. The shaft 92 is driven by another right-angle gear unit 94 located below the thrust bearing 78. The gear unit 94 is driven by a reduction gear unit 96 which, in utrn, is driven by a motor 98, preferably an electric motor. The motor 98 may be a reversible motor for some applications of the invention, if desired.

The driving platform 74 is adapted to be pivoted, about the vertical axis 28, through angles of 90° in opposite directions from a normal or central position by double-acting hydraulic or pneumatic units 100 and 102, respectively. These units respectively include cylinders 104 and 106 respectively pivotally connected to the lower housing 24 at 108 and at a point below the pivot 62. The units 100 and 102 respectively include piston rods 112 and 114 both pivotally connected to a pin 116 on a radial arm 118 on the driving platform column 76. The units 100 and 102 diverge from the common pin 116 and are oriented at angles such that energization of one of these units to pivot the driving platform 74 results in only slight relative movement of the piston and cylinder of the other.

As will be apparent, the hydraulic units 100 and 102 are adapted to pivot the driving platform 74 between a neutral or central normal position and positions spaced 90° from such normal position on opposite sides thereof. Thus, the driving rollers 80 may be turned from their normal positions to positions in which they will propel an article thereon in directions spaced 180° apart.

*Operation*

As previously outlined, articles delivered to the turning apparatus 10 may be discharged therefrom with their direction of travel changed, their orientations changed, or both. More particularly, articles may be delivered to the turning apparatus 10 from one or more directions with one or more orientations and may be discharged therefrom in one or more directions with one or more orientations, the outgoing directions and orientations being the same as and/or different from the incoming directions and orientations. The particular operations, or combinations of operations, performed on articles handled by the turning apparatus 10 may be varied by changing the angular position of the turntable 26 in one direction or the other from normal, by changing the position of the driving platform 74 in one direction or the other from normal, and by changing the direction of rotation of the motor 98. The desired operations or combinations of operations may be effected by any suitable sequence controller, not shown, acting on the hydraulic or pneumatic units 42, 58, 100 and 102 and on the motor 98.

FIGS. 1, 1a, 1b, 1c, 1d, 1e and 1f illustrate one combination of operations which can be performed to achieve a particular direction change and orientation change, it being understood that numerous others are possible.

Referring to FIG. 1, the conveyers 12 and 14 are shown as being driven in the directions of the arrows 120 and 122, respectively. An article 124, which may be a stack of newspapers to be delivered to a tying machine, not illustrated, is shown approaching the turning apparatus 10 on the conveyer 12. The article 124 is to be delivered to the conveyer 14 with its orientation changed by 90° relative to its new direction of movement. Under these conditions, the conveyers 16 and 18 are not in use.

Referring to FIG. 1a, the article 124 has been delivered to the driving platform 74 by the conveyer 12 and has been pulled onto the driving platform by the driving rollers 80. At this point, the article 124 engages a limit switch 126 on the turntable 26 for stopping the motor 98, which may be equipped with a brake, not shown, to prevent coasting.

In FIG. 1b, the turntable 26 has been elevated into its upper position, without, however, pivoting it about the axis 28, and the driving platform 74 has been pivoted through 90° to align the driving rollers 80 with the conveyer 14.

Referring to FIG. 1c, the turntable 26 has been moved downwardly into its lower position to permit reengagement of the article 124 with the driving rollers 80, the latter have discharged the article onto the conveyer 14. Thus, in transferring the article 124 from the conveyer 12 to the conveyer 14, both the direction of travel of the article and its orientation relative to its new direction of travel were changed.

It will be understood that if the driving platform 74 was pivoted in the counterclockwise direction between FIGS. 1a and 1b, the direction of rotation for the driving rollers 80 was the same in FIG. 1c as in FIG. 1a. However, if the driving platform 74 was pivoted in the clockwise direction between FIGS. 1a and 1b, it was necessary to reverse the direction of rotation of the motor 98 in FIG. 1c to effect movement of the article 124 onto the conveyer 14.

FIGS. 1b, 1e and 1f illustrate the steps involved in returning the various components to their original positions. More particularly, in FIG. 1d, the turntable 26 has been elevated, in FIG. 1e the driving platform 74 has been pivoted back into its original position, and in FIG. 1f the turntable has been lowered preparatory to receiving another article from the conveyer 12. Essentially, the steps shown for returning the various components to their original positions are the reverse of the steps performed in going from FIGS. 1a to 1c.

As previously pointed out, diverting the article 124 from the conveyer 12 to the conveyer 14 with a changed orientation is merely illustrative of one combination of operations which may be performed on the article, numerous others being possible. For example, by pivoting the turntable 26 through 90° without pivoting the driving platform 74, the article 124 may be delivered to the conveyer 16 with its orientation changed 90°. Alternatively, the article may be delivered to the conveyer 18 either with or without an orientation change. Further, articles may be received from two or three of the conveyers shown and delivered to two or one of the conveyers, with or without orientation changes.

Although an exemplary embodiment of the invention has been disclosed herein for purposes of illustration, it will be understood that various changes, modifications and substitutions may be incorporated in such embodiment without departing from the spirit of the invention as defined by the claims which follow.

We claim:

1. In a turning apparatus, the combination of: a driving platform including coplanar driving rollers, said driving platform being pivotable about an upright axis; means for rotating said driving rollers; means for pivoting said driving platform about said upright axis; a second platform substantially coextensive with said driving platform, one of said platforms being movable relative to the other along said upright axis between a position wherein said driving rollers project above said second platform and a position wherein said driving rollers are below the upper surface of said second platform; and means for moving said one platform along said upright axis from each of said positions to the other.

2. In a turning apparatus, the combination of: a driving platform including coplanar driving rollers, said driving platform being pivotable about an upright axis; means for rotating said driving rollers; means for pivoting said driving platform about said upright axis; a second platform substantially coextensive with said driving platform, said second platform being movable along said upright axis between a position wherein said driving rollers project above said second platform and a position wherein said driving rollers are below the upper surface of said second platform; and means for moving said second platform along said upright axis from each of said positions to the other.

3. In a turning apparatus, the combination of: a driving platform including coplanar driving rollers, said driving platform being pivotable about an upright axis; means for rotating said driving rollers; means for pivoting said driving platform about said upright axis; a second platform substantially coextensive with said driving platform, said second platform being movable along said upright axis between a position wherein said driving rollers project above said second platform and a position wherein said driving rollers are below the upper surface of said second platform, said second platform also being pivotable about said upright axis; means for moving said second platform along said upright axis from each of said positions to the other; and means for pivoting said second platform about said upright axis.

4. In a turning apparatus, the combination of: a driving platform including coplanar driving rollers, said driving platform being pivotable about an upright axis; means for rotating said driving rollers; means for pivoting said driving platform about said upright axis; a second platform substantially coextensive with said driving platform, said second platform having openings therein through which said driving rollers are capable of projecting upwardly above said second platform, said second platform being movable along said upright axis between a position wherein said driving rollers project above said second platform and a position wherein said driving rollers are below the upper surface of said second platform, said second platform also being pivotable about said upright axis; means for moving said second platform along said upright axis from each of said positions to the other; and means for pivoting said second platform about said upright axis.

References Cited in the file of this patent

UNITED STATES PATENTS 2,897,948    Cranston _____ Aug. 4, 1959